United States Patent
Nemawarkar et al.

(10) Patent No.: US 10,061,655 B2
(45) Date of Patent: Aug. 28, 2018

(54) VOLATILE CACHE RECONSTRUCTION AFTER POWER FAILURE

(71) Applicant: Seagate Technology LLC, Cupertino, CA (US)

(72) Inventors: Shashank Nemawarkar, Austin, TX (US); Balakrishnan Sundararaman, Austin, TX (US); Mark Ish, Castro Valley, CA (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 0 days.

(21) Appl. No.: 15/152,295

(22) Filed: May 11, 2016

(65) Prior Publication Data
US 2017/0329706 A1  Nov. 16, 2017

(51) Int. Cl.
| | | |
|---|---|---|
| G06F 11/00 | (2006.01) | |
| G06F 11/14 | (2006.01) | |
| G06F 12/0804 | (2016.01) | |
| G06F 3/06 | (2006.01) | |
| G06F 12/0866 | (2016.01) | |
| G06F 11/07 | (2006.01) | |
| G06F 9/4401 | (2018.01) | |

(52) U.S. Cl.
CPC ........ *G06F 11/1456* (2013.01); *G06F 3/0605* (2013.01); *G06F 3/0619* (2013.01); *G06F 3/0647* (2013.01); *G06F 3/0653* (2013.01); *G06F 3/0673* (2013.01); *G06F 9/4418* (2013.01); *G06F 11/0727* (2013.01); *G06F 11/0751* (2013.01); *G06F 11/0793* (2013.01); *G06F 12/0804* (2013.01); *G06F 12/0866* (2013.01); *G06F 11/1446* (2013.01); *G06F 2212/1032* (2013.01); *G06F 2212/261* (2013.01); *G06F 2212/305* (2013.01); *G06F 2212/3042* (2013.01); *G06F 2212/7208* (2013.01)

(58) Field of Classification Search
CPC ............ G06F 11/0727; G06F 11/0751; G06F 11/0793; G06F 11/1402; G06F 11/1448; G06F 11/1456; G06F 11/1471; G06F 12/0804; G06F 12/0866; G06F 3/0919; G06F 3/0647; G06F 3/0653; G06F 3/0673; G06F 3/0605; G06F 2201/1032; G06F 2201/261; G06F 2201/3042; G06F 2201/305; G06F 3/0619
USPC ....................... 714/6.2, 14, 6.1, 42
See application file for complete search history.

(56) References Cited

U.S. PATENT DOCUMENTS

| | | | |
|---|---|---|---|
| 6,195,754 B1 * | 2/2001 | Jardine | ............... G06F 1/30 713/324 |
| 6,725,397 B1 | 4/2004 | Emberty et al. | |
| 7,100,080 B2 | 8/2006 | Howe | |
| 8,261,012 B2 | 9/2012 | Kan | |
| 9,286,203 B2 | 3/2016 | Abraham et al. | |
| 2006/0212644 A1 * | 9/2006 | Acton | ................. G06F 1/30 711/103 |

(Continued)

*Primary Examiner* — Joseph D Manoskey
(74) *Attorney, Agent, or Firm* — Holzer Patel Drennan

(57) ABSTRACT

The disclosed technology provides for off-loading dirty data from a volatile cache memory to multiple non-volatile memory devices responsive to detection of a power failure. The arrangement of the dirty data is describable by a cache image, which is reconstructed within the volatile memory from the non-volatile memory devices responsive to detection of power restoration following the power failure.

21 Claims, 5 Drawing Sheets

(56) References Cited

U.S. PATENT DOCUMENTS

| | | | |
|---|---|---|---|
| 2010/0180065 A1* | 7/2010 | Cherian | G06F 12/0804 |
| | | | 711/103 |
| 2010/0202237 A1* | 8/2010 | Moshayedi | G11C 5/141 |
| | | | 365/228 |
| 2011/0197036 A1* | 8/2011 | Ishii | G06F 12/0866 |
| | | | 711/155 |
| 2013/0254457 A1* | 9/2013 | Mukker | G06F 11/1441 |
| | | | 711/103 |
| 2015/0006815 A1* | 1/2015 | Madhusudana | G06F 12/0866 |
| | | | 711/114 |
| 2016/0071609 A1 | 3/2016 | Lucas et al. | |

* cited by examiner

VOLATILE CACHE RECONSTRUCTION AFTER POWER FAILURE

CROSS-REFERENCE TO RELATED APPLICATIONS

This present application is related to U.S. patent application Ser. No. 15/152,374, entitled "Cache Offload Across Power Fail," and filed concurrently herewith, which is specifically incorporated by reference herein for all that it discloses and teaches.

BACKGROUND

Storage devices may use a data cache to store certain types of data (e.g., frequently accessed and/or recently accessed data) and to reduce a total number of data storage reads and/or writes to a main storage area. Although different types of storage media support cache storage regions, some storage devices store cache data on a volatile memory (e.g., DRAM, SRAM) because volatile memory can, in general, be accessed more quickly than non-volatile memory. However, one drawback to volatile memory is that data cannot be maintained within the volatile memory if power is lost. Therefore, many existing devices with volatile data cache regions are unable to ensure full data recovery responsive to unexpected power-loss scenarios.

BRIEF DESCRIPTIONS OF THE DRAWINGS

SUMMARY

One implementation of the disclosed technology provides a storage controller that off-loads dirty data from a volatile cache memory to two or more non-contiguous storage regions of non-volatile memory responsive to detection of a power failure. The volatile cache memory includes an arrangement of data describable by a cache image. Responsive to detecting a power restoration sequence, the power controller reconstructs the cache image of the dirty data from the non-volatile memory and restores the cache image within the volatile memory.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. These and various other features and advantages will be apparent from a reading of the following Detailed Description.

DETAILED DESCRIPTION

Figure 1:
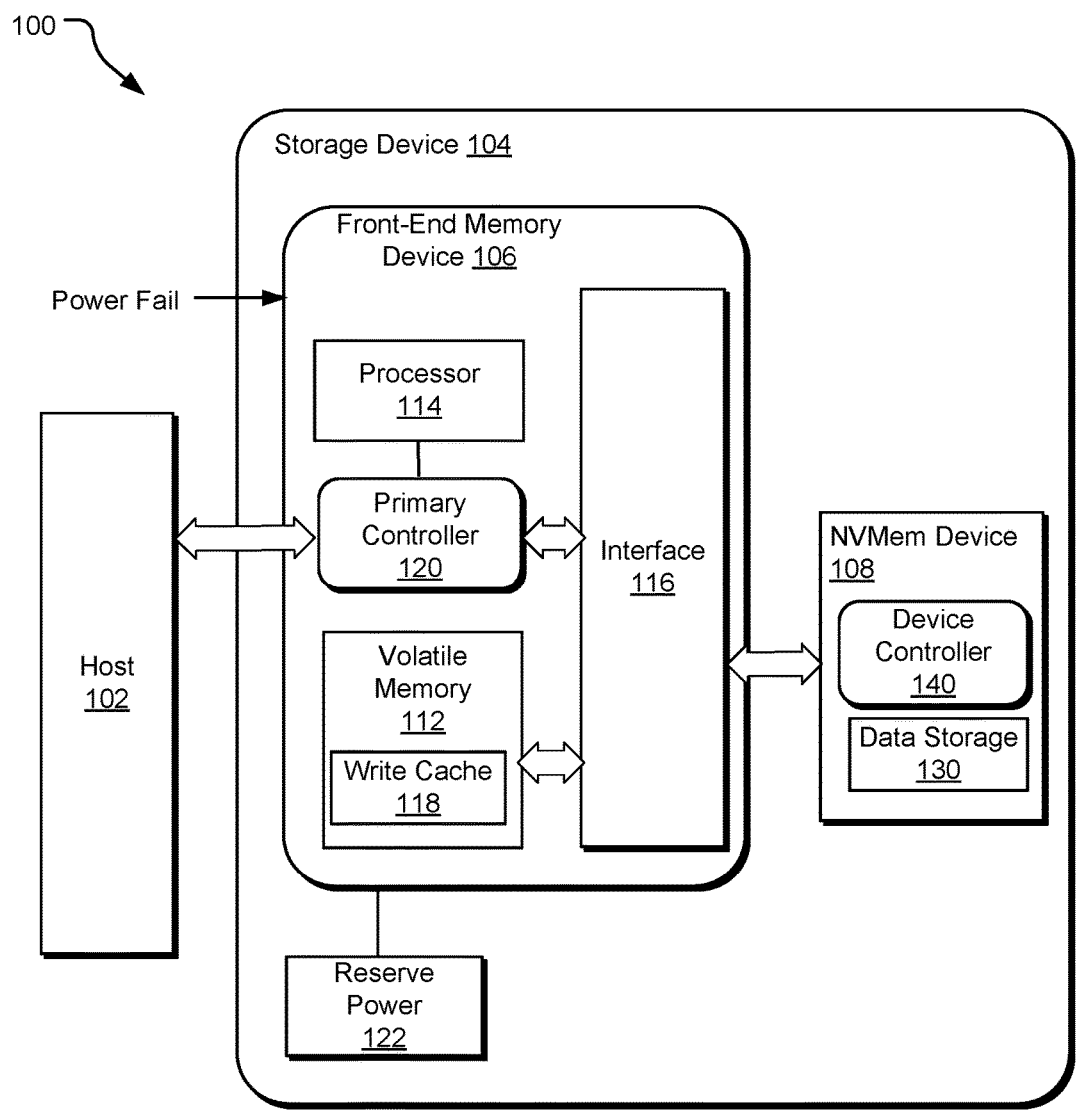
FIG. 1 illustrates an example data storage system that implements procedures for cache off-load and cache image restoration within volatile memory following an unexpected power failure.

FIG. 1 illustrates an example data storage system 100 that implements procedures for cache off-load and cache image restoration within a volatile memory 112 following an unexpected power failure. As detailed below, preserving the cache image in-tact within one or more non-volatile memory devices (e.g., non-volatile memory device 108) can allow the data storage system 100 to quickly re-assume a pre-power loss state when system power is restored following the power loss.

The data storage system 100 includes a host device 102 that transmits data access commands (e.g., read, write, and/or erase commands) to a data storage device 104. The data storage device 104 includes a front-end memory device 106 that interfaces with the host device 102 and also interfaces with at least one non-volatile memory device (e.g., a non-volatile memory device 108). A primary controller 120 of the front-end memory device 106 is executed by a processor 114 to receive and processes data access commands from the host device 102 according to a self-managed mapping scheme that maps host logical block addresses (LBAs) to physical data storage space in non-volatile storage (e.g., a data storage region 130 within the non-volatile memory device 108).

In one implementation, the host 102 does not have access to information regarding how storage space is distributed within the storage device 104. For example, the host 102 may have access to a total storage capacity of the storage device 104, but may lack access to information such as how many volatile and/or non-volatile storage devices are included in the storage device 104 or how the total storage capacity is divided between such devices. In different implementations, the non-volatile memory device 108 may take on a variety of forms including without limitation one or more magnetic storage disks, solid state drives (e.g., an array of SSDs), flash memory optical storage disks, or any combination thereof. Although not shown, the front-end memory device may include one or more non-volatile memory devices as well, such as an on-chip flash memory that includes a flash controller to communicate with the primary controller 120.

The front-end memory device 106 further includes interface circuitry 116 that generates control signals that enable the processor 114 to communicate with the volatile memory 112 and with the non-volatile memory device 108. The interface circuitry 116 of the front-end memory device 106 includes suitable state machine circuitry for accessing a write cache 118 in the volatile memory 112 during execution of access commands from the host 102 and for subsequently transferring such data to the non-volatile memory device 108.

The non-volatile memory device 108 includes data storage region 130 and a device controller 140 for receiving the control signals and command data (e.g., target address information) from the interface circuitry 116 and for further executing incoming data access commands. Although the non-volatile memory device 108 is shown to be in a same physical enclosure as the front-end memory device 106, the non-volatile memory device 108 is, in other implementations, physically separated from (e.g., remote from) the front-end memory device 106. During an example write operation, the primary controller 120 executes a write command from the host 102 through the interface 116 to the data storage 130 in the non-volatile memory device 108 without writing data to the write cache 118. In other example write operations, the primary controller 120 executes a write command from the host 102 by initially writing incoming data to the write cache 118 instead of to a physical address in the data storage 130 corresponding to a target address (e.g., logical block address or LBA) that the host 102 specifies along with the write command.

Data written to the volatile memory 112 and awaiting transfer to a more permanent location is referred to as "dirty," a term of art indicating that the data is yet to be stored permanently within the non-volatile storage. If a power outage occurs, dirty data can be lost.

Responsive to a write of dirty data to the write cache 118, the primary controller 120 immediately acknowledges that the data has been stored on the data storage system 130. In one implementation, this acknowledgment falsely informs the host 102 that the data has been stored in a permanent, non-volatile memory location when the data is actually residing exclusively in the volatile memory 112 (e.g., DRAM, SRAM). This 'false' acknowledgement mitigates write latencies by allowing the host 102 to continue with normal operations rather than wait for a lengthy data write and acknowledgement to and from the non-volatile memory device 108.

Due to false acknowledgements from the primary controller 120, the host 102 may not have accurate (or any) information regarding which data is 'dirty' and/or safely written to non-volatile memory of the data storage 130 as opposed to merely the volatile memory 112. Therefore, it is the primary controller 120—rather than the host 102—that assumes the responsibility of managing the write cache 118. During periodic or systematic cache flush processes unbeknownst to the host 102, dirty data in the write cache 118 is routed and written to physical locations in the data storage 130 that are mapped, by the primary controller 120, to host logical block addresses (LBA(s)) originally associated with the dirty data.

In addition to managing routine cache flush operations, the primary controller 120 may also execute data preservation processes responsive to unexpected power loss events or predefined events such as a certain level of reset detected at the primary controller 120 or at the interface with the host 102. As used herein, "unexpected power loss" refers to a power loss that occurs in a non-routine manner. When an unexpected power loss occurs, the storage device 104 may not execute usual shut-down procedures that ensure data integrity. An unexpected power loss may occur, for example, when a user pulls a power plug, when battery life of the storage device 104 expires, or when a connection between the host 102 or a power supply and the storage device is suddenly severed or altered. In the event of an unexpected power loss, the primary controller 120 utilizes a reserve power supply 122 to preserve dirty data of the write cache 118 prior to complete shutdown of the storage device 104.

The reserve power supply 122 is a different power source than a primary power source (e.g., power from the host 102, a main battery, power plug, etc.), and may generally include one or more batteries, capacitors, or a back EMF (electromotive force) sufficient to power the cache 118, certain portions of the primary controller 120, and the non-volatile memory device 108 for a period of time sufficient to facilitate a full transfer of all data in the write cache 118 to the non-volatile memory device 108.

The primary controller 120 utilizes the reserve power supply 122 to perform cache off-load operations triggered by unexpected power loss events. Unlike a 'cache flush,' which flushes cache data to the corresponding target LBA locations (e.g., permanent locations associated with the host LBAs), a cache "off-load" (as used herein) moves cache data to non-volatile storage locations other than the corresponding target LBA locations. For example, the cache off-load may move cache data to a region of the data storage 130 specifically designated for dirty data that has not yet been written to corresponding LBA locations.

The primary controller 120 may, in certain circumstances, copy and write a "cache image" to the data storage 130 during a cache off-load. As used herein, the term "cache image" refers to a replica of content and arrangement of dirty data in the write cache 118 at a defined point in time. For example, the cache image may preserve all relevant cache data and structures (e.g., data and structures not easily reproducible), pointers, and any other relevant information, such as metadata. For example, a cache image of write cache 118 may include a full or partial image of dirty data in the write cache 118 at a given instant, such as at the moment that an unexpected power failure is detected by the primary controller 120. In the case of a "partial image," the cache image may include a portion of the total amount of dirty data in the cache. Examples of "cache images" are discussed in greater detail with respect to FIGS. 2-3.

In one implementation, the primary controller 120 off-loads a full or partial cache image to a designated region of the data storage 130 responsive to detection of an unexpected power loss. When a restoration of power is subsequently detected, the primarily controller 120 initiates a cache image restoration process to restore the write cache 118 to an exact state assumed at the time of the cache off-load. In this way, a pre-power failure state of the data storage system 100 is quickly restored and without a loss of data.

The above-described techniques for cache image restoration enhance a user experience by facilitating an immediate and complete restoration of a user session on the host 102 when the storage device 104 powers up following an unexpected power loss. If, for example, power is lost when a user is working within a session of the host 102 with several open application windows and/or documents, the above-described cache image restoration permits the host 102 to quickly re-store the session (e.g., by re-opening the windows and documents) when power is re-gained without any user data loss whatsoever. Specific examples and implementations of cache image restoration are further discussed with respect to the following figures.

In various implementations, the primary controller 120 and the device controller 140 of the non-volatile memory device 108 may be implemented in a variety of suitable tangible computer-readable storage media including without limitation RAM, ROM, EEPROM, flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information and which can accessed by mobile device or computer. In contrast to tangible computer-readable storage media, intangible computer-readable communication signals may embody computer readable instructions, data structures, program modules or other data resident in a modulated data signal, such as a carrier wave or other signal transport mechanism. The term "modulated data signal" means a signal that has one or more of its characteristics set or changed in such a manner as to encode information in the signal.

Figure 2:
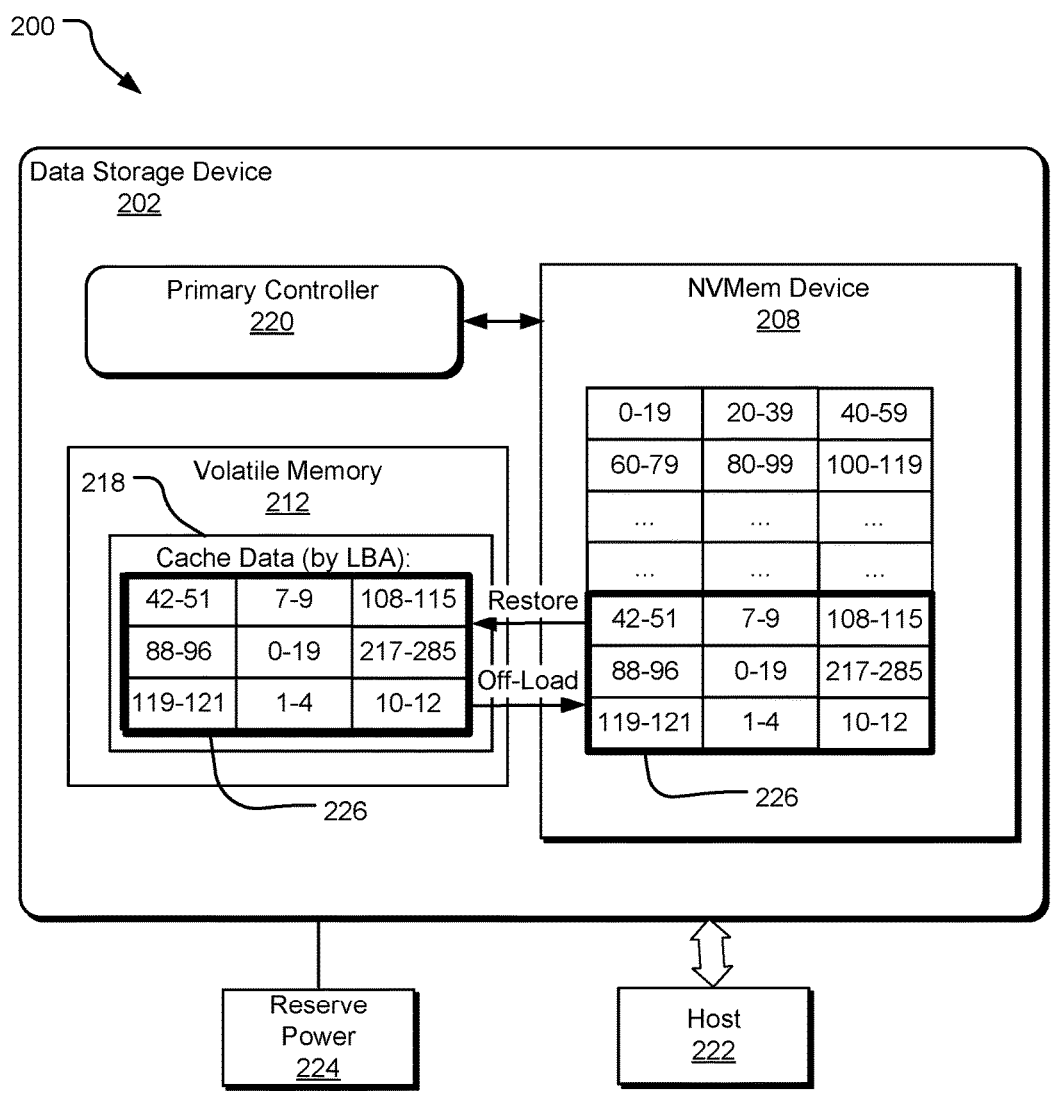
FIG. 2 illustrates another example data storage system that implements procedures for cache off-load responsive to an unexpected power failure and procedures for restoring a cache image within a volatile memory responsive to power restoration.

FIG. 2 illustrates an example data storage system 200 that implements procedures for off-loading a write cache 218 responsive to unexpected power failure and procedures for restoring the write cache 218 responsive to power restoration. The data storage system 200 includes a data storage device 202 communicatively coupled to a host device 222. The data storage device 202 includes a primary controller 220 that interfaces with a volatile memory 212 and also with one or more non-volatile memory devices (e.g., a non-volatile memory storage device 208. The volatile memory 212 includes a write cache 218 that is describable, at an instant in time, by a cache image 226. The cache image 226 includes an arrangement of data blocks that each correspond to a host-specified logical block address (LBA). Example LBAs corresponding to various data blocks are indicated by the numbers illustrated within the cache image 226. The host-specified LBAs are mapped, via a mapping scheme of the primary controller 220, to physical addresses in storage of a non-volatile memory storage device 208. For example, LBAs 0-19 are mapped to a first set of physical data blocks; LBAs 20-39 are mapped to a second set of physical data blocks; and so on. When writing data to the write cache 218, the primary controller 220 may falsely acknowledge the data writes to the host 222 as if the data were successfully written to the non-volatile memory storage device 208.

Responsive to detection of an unexpected loss in power, the primary controller 220 uses power from a reserve power source 224 to execute a series of commands that off-load dirty data of the write cache 218 in to the non-volatile memory storage device 208. The cache off-load preserves a cache image 226, which may include either all dirty data of the write cache 218 or a select subset (e.g., a partial image) of the dirty data of the write cache 218. For example, a partial image may exclude some dirty data while including portions of the data pre-identified or flagged as 'most important.' The amount of dirty data captured by the cache image 226 may vary from one implementation to another and between power failure scenarios based on an amount of system power available for writing the dirty data to the non-volatile memory device 208.

In FIG. 2, the entire cache image 226 is saved within a contiguous storage region of the non-volatile memory device 208. In some implementations (e.g., as in FIG. 3), the cache image 226 is split into different portions that are each stored in non-contiguous storage regions. As used herein, the term "non-contiguous storage regions" may refer to non-contiguous storage regions on a single non-volatile memory device and/or regions on two or more different non-volatile memory devices.

When the primary controller 220 detects a power-up sequence of the data storage device, one or more state checks may inform the primary controller 220 that the recent power loss was unexpected. In such cases, the primary controller 220 executes a series of cache restore commands to restore the cache image 226 within the volatile memory 212.

As a result of a successful cache restore, the write cache 218 is made identical (or nearly identical) to a former state assumed immediately prior to the unexpected power failure. In implementations where the cache image 226 is stored in two or more non-contiguous regions of the non-volatile memory device 208, the primary controller 220 may initialize all internal data blocks and data structures of the write cache 218 and bring back the data from the various non-contiguous regions into the write cache 218 according to the original cache image 226. This action may entail overwriting some or all of the write cache 218. Following the cache restore, the write cache 218 includes the cache image 226 off-loaded prior to the unexpected power failure. The cache restore may be followed by a cache flush, which then flushes the dirty data from the volatile memory 212 to physical regions corresponding to the LBA locations originally specified by the host 222.

Figure 3:
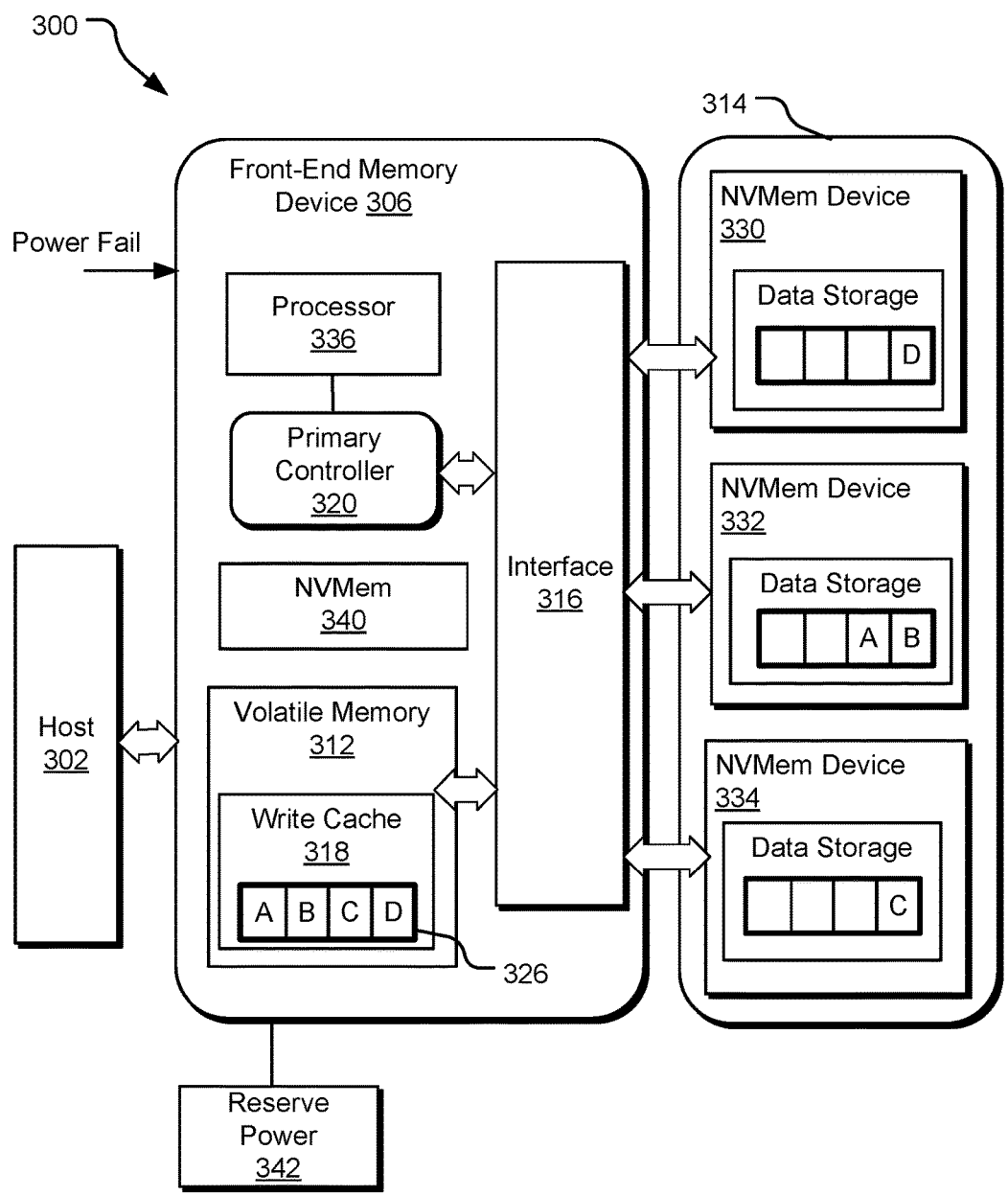
FIG. 3 illustrates another example data storage system implements procedures for cache off-load responsive to an unexpected power failure and procedures for restoring a cache image within a volatile memory responsive to power restoration.

FIG. 3 illustrates another example data storage system 300 that implements procedures for cache off-load responsive to an unexpected power failure and procedures for restoring a cache image 326 within a volatile memory responsive to power restoration. The data storage system 300 includes a front-end memory device 306 that interfaces with an array 314 of non-volatile memory devices (e.g., non-volatile memory devices 330, 332, 334). The front-end memory device 306 includes a primary controller 320, a processor 336, a volatile memory 312 (e.g., DRAM), and a non-volatile memory 340 (e.g., an on-chip flash card).

The primary controller 320 processes and executes data access commands from a host 302, manages an internal mapping scheme of host LBAs to physical storage space in the array 314, and implements data preservation measures to preserve cache data from a write cache 318 of the volatile memory 312 in the event of power loss. Interface circuitry 316 generates control signals that enable the processor 336 to communicate with the volatile memory 312 and each non-volatile memory device in the array 314.

Each non-volatile memory device in the array 314 may include an independent controller, such as a flash controller (not shown) for managing data reads and writes within the respective device. Different devices in the array 314 of non-volatile memory devices may be identical or non-identical with the same or disparate storage characteristics (e.g., storage capacity, memory type, access speed, redundancies, etc.). In one implementation, the array 314 is an array of flash memory devices. Although the array 314 is shown to include three non-volatile memory devices 330, 332, and 334, the array 314 may include fewer or greater than three non-volatile memory devices in other implementations.

Incoming data from the host 302 is written to the write cache 318 of the volatile memory 312 and subsequently transferred to permanent storage locations in the array 314. At any given time, a state of the write cache 318 can be described by the cache image 326, which includes an assortment of dirty data that the primary controller 320 may elect to preserve in the event of an unexpected power failure. In the example of FIG. 3, the cache image 326 includes four contiguously-stored sections labeled 'A', 'B', 'C', and 'D.'

Responsive to each write of dirty data to the write cache 318, the primary controller 320 sends an acknowledgement that falsely informs the host 302 that the dirty data has been stored in permanent, non-volatile storage locations corresponding to the LBAs of the dirty data specified by the host 302. Transmittal of this false acknowledgement allows the host 302 to continue with normal operations rather than wait for a lengthy data write and acknowledgement to and from one or more devices of the array 314. Incidentally, this false acknowledgement also facilitates advanced write coalescing to reduce a number of total writes to the non-volatile memory devices 330, 332, 334 and, in turn, extend the lifetime of devices in the array 314.

Due to these false acknowledgements from the primary controller 320, the host 302 may not have accurate (or any) information regarding which data is 'dirty' and/or safely written to non-volatile memory devices of the array 314. Therefore, the primary controller 320 assumes the responsibility of preserving dirty data during unexpected power failure events.

When the primary controller 320 detects an unexpected power loss, the primary controller 320 immediately halts normal storage operations and begins to draw power from a reserve power source 342. The primary controller 320 assesses how much dirty data is currently residing in the write cache 318 and, based on power availability and power constraints related to data writes of the existing dirty data, selects one or multiple devices of the array 314 of non-volatile memory devices to receive all or a portion of the dirty data from the write cache 318. The primary controller 320 then powers down any devices of the array 314 that are not selected to receive a portion of the dirty data from the write cache 318.

If a single non-volatile memory device (e.g., any of 330, 332, or 334) of the array 314 is selected, the primary controller 320 offloads the cache image 326 to storage (either contiguous or non-contiguous storage) within the selected non-volatile device. If multiple non-volatile memory devices of the array 314 are selected, the controller 320 may elect to off-load different portions of the cache image 326 to the different devices and/or to non-contiguous regions of within any one of the selected devices of the array 314. In the example of FIG. 3, the primary controller 320 offloads the portion 'D' of the cache image 326 to a reserved area in the non-volatile memory device 330, offloads the contiguous portions 'A', 'B' of the cache image 326 to a reserved area in the non-volatile memory device 332, and offloads the portion 'C' of the cache image 326 to a reserved area in the non-volatile memory device 334. The determination of where to send each portion can be based on a number of different factors including without limitation power constraints related to data writes on each device in the array 314, a type of data being saved (e.g., application data versus user data), known or observed performance issues for the individual devices, etc.).

Prior to exhausting the reserve power 342, the primary controller 320 creates and saves a log file in the non-volatile memory 340. The log file maps former volatile cache locations of the dirty data to the associated new physical locations in the array 314. When power is restored to the data storage device 300, the primary controller 320 reconstructs the cache image 326 based on the information in the log file identifying the non-volatile memory locations and the corresponding volatile cache locations for the dirty data. For example, the log file may include one or more of: the sizes and locations of non-contiguous regions in the non-volatile memory devices 330, 332, and 334 that are allocated for receipt and storage of dirty data; the start and end addresses of each portion of the cache image 326 within the various non-contiguous regions; mapping information regarding host addresses in association with the dirty data; and/or one or more rules governing the order by which the different portions of the cache image 326 are to be restored to the write cache 318 from the various non-contiguous regions. According to one implementation, the write cache 318 is restored from the various non-contiguous regions according to a same order that it was offloaded to the various non-contiguous regions.

Once the cache is reconstructed as described above, the primary controller 320 restores the dirty data in the write cache 318 to a pre-power failure state. Following the restore, the primary controller 320 executes a cache flush operation, which sends all the dirty data of the write cache 318 that is mapped to the non-volatile array 314 to corresponding target locations in the non-volatile memory array 340 (e.g., the physical locations mapped to the corresponding host-specified LBAs). Notably, some dirty data may not be mapped to the non-volatile memory array 314 and thus be retained in the write cache 318 indefinitely.

Figure 4:
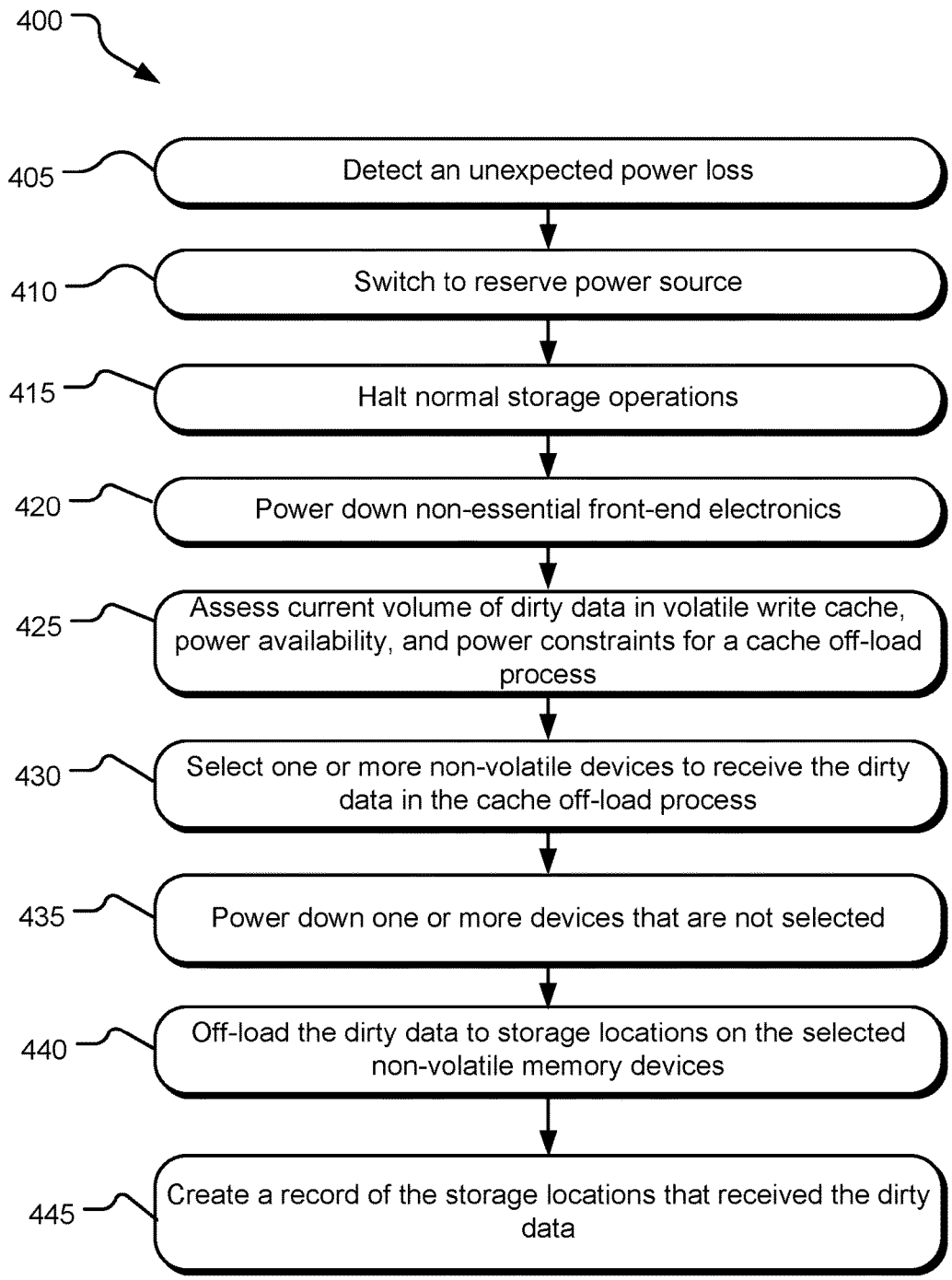
FIG. 4 illustrates example operations for off-loading dirty data from a write cache in volatile memory to one or more non-volatile memory devices.

FIG. 4 illustrates example operations 400 for off-loading dirty data from a write cache in volatile memory to one or more non-volatile memory devices. A detection 405 first detects an unexpected power loss. A power source switching operation 410 switches a power supply from a failed power source to a reserve power source. In one implementation, the failed power source is an electrical connection to a host device. The reserve power source may be provided by, for example, batteries, one or more capacitors, etc. After switching to the reserve power source, a halting operation 415 halts all normal storage operations of a storage device. A partial power down operation 420 shuts down portions of the storage device that are not needed to preserve dirty data, such front-end electronics that interface with a host device.

An assessment operation 425 assesses how much dirty data is currently residing in a volatile write cache and how much time remains until the reserve power is exhausted assuming various different cache off-load scenarios. For example, the assessment operation 425 assesses time/charge profiles for each device in the non-volatile memory array and selects the device or combinations of devices that can off-load the data while utilizing the least amount of power. Based on this assessment of available power and power likely expended during different off-load scenarios, a selection operation 430 selects one or more devices of a non-volatile memory array to receive all or a portion of the dirty data. For example, selection operation 430 may elect to send some of the dirty data to a first subset of the non-volatile memory device and another subset of the dirty data to a second non-volatile memory device.

A power down operation 435 powers down any devices of the non-volatile memory array that are not selected by the selection operation 430. A cache off-load operation 440 offloads the dirty data to the one or more selected devices of the non-volatile memory array. In one implementation, the dirty data is saved contiguously in the non-volatile memory array. In other implementations, the dirty data is saved non-contiguously (e.g., as one or more image segments) within the non-volatile memory array. Regardless of whether the dirty data is saved contiguously or non-contiguously, the dirty data is usable to reconstruct a single contiguous cache image.

A recording operation 445 records locations (e.g., LBAs or physicals block addresses (PBAs) within the selected non-volatile memory devices that receive the dirty data. For example, the recording operation 445 may create one or more entries in a log file mapping a previous range of addresses in a volatile memory space to a new range of addresses in non-volatile memory space of the selected devices. During a cache restore following a subsequent power-on sequence of the storage device, the log file can be accessed to restore the volatile cache to include a cache image associated with a pre-power failure state. According to one implementation, the cache image is reconstructed from multiple non-contiguous storage locations.

Figure 5:
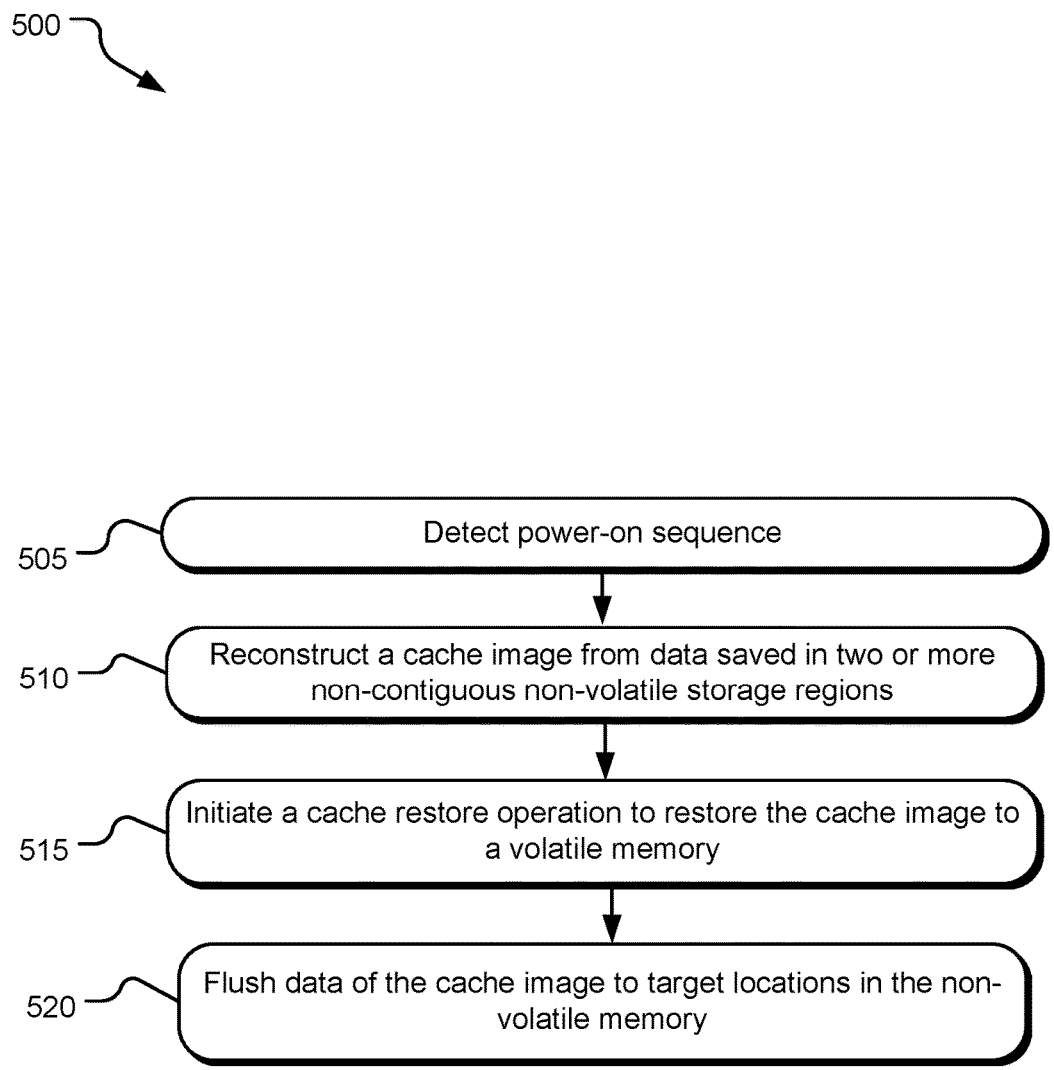
FIG. 5 illustrates example operations for restoring a cache image from multiple non-volatile memory devices responsive to power restoration following an unexpected power failure.

FIG. 5 illustrates example operations 500 for restoring a cache image from multiple non-volatile memory devices responsive to power restoration following an unexpected power failure. A detection operation 505 detects a power-on sequence of a storage device and determines that a recent power failure was unexpected. Responsive to this determination a cache reconstruction operation 510 reconstructs a cache image from data now saved in two or more non-contiguous non-volatile storage regions. In one implementation, the cache image corresponds to a time when the unexpected power failure was first detected. For example, the reconstruction operation 510 may entail accessing a log file to identify non-volatile storage locations of cache data (e.g., dirty data) as well as the corresponding volatile memory locations where the data resided prior to the unexpected power failure. In one implementation, the reconstruction operation 510 reconstructs the cache image from multiple non-contiguous storage locations. For example, the cache image may be reconstructed from one or more non-contiguous storage regions on a same non-volatile memory device or from regions located on separate storage devices.

A cache restore operation 515 restores the reconstructed cache image to the volatile cache prior so that an image of dirty data in the cache is identical (e.g., in content in arrangement) to that stored within the volatile cache prior to the power failure. In some implementations, the restored image is a partial image, meaning that the image excludes some dirty data that was present in the volatile cache at the time of the power failure. As a result of the cache store, a user environment on a host computer can be quickly restored to a state assumed just prior to the power loss (e.g., open windows, data, etc.). Following the cache restore operation 515, a cache flush operation 520 flushes the volatile cache to send the dirty data of the reconstructed cache image to target locations (e.g., the data blocks corresponding to host-specified LBAs) in the non-volatile memory array.

The embodiments of the disclosed technology described herein are implemented as logical steps in one or more computer systems. The logical operations of the presently disclosed technology are implemented (1) as a sequence of processor-implemented steps executing in one or more computer systems and (2) as interconnected machine or circuit modules within one or more computer systems. The implementation is a matter of choice, dependent on the performance requirements of the computer system implementing the disclosed technology. Accordingly, the logical operations making up the embodiments of the disclosed technology described herein are referred to variously as operations, steps, objects, or modules. Furthermore, it should be understood that logical operations may be performed in any order, adding and omitting as desired, unless explicitly claimed otherwise or a specific order is inherently necessitated by the claim language.

The above specification, examples, and data provide a complete description of the structure and use of exemplary embodiments of the disclosed technology. Since many embodiments of the disclosed technology can be made without departing from the spirit and scope of the disclosed technology, the disclosed technology resides in the claims hereinafter appended. Furthermore, structural features of the different embodiments may be combined in yet another embodiment without departing from the recited claims.

What is claimed is:

1. A method comprising:
   writing dirty data to a volatile cache memory; and
   responsive to detection of a power failure, selecting a subset of available non-volatile memory devices based on estimated power consumption during cache offload for different combinations of the available non-volatile memory devices receiving different portions of the dirty data during the cache offload; and
   off-loading the dirty data to the selected subset of the available non-volatile memory devices.

2. The method of claim 1, further comprising:
   off-loading the dirty data from the volatile cache memory to two or more non-contiguous storage regions of non-volatile memory responsive to the detection of the power failure, wherein an arrangement of the dirty data is describable by a cache image; and
   reconstructing the cache image of the dirty data from the non-volatile memory and restoring the cache image within the volatile cache memory responsive to detection of power restoration following the power failure.

3. The method of claim 2, further comprising:
   responsive to restoration of the cache image within the volatile cache memory, flushing the dirty data of the reconstructed cache image to corresponding target logical block addresses in the non-volatile memory.

4. The method of claim 2, wherein different subsets of the dirty data are off-loaded to different non-volatile memory devices.

5. The method of claim 1, further comprising:
   powering down portions of a storage device prior to off-loading the dirty data.

6. The method of claim 1, wherein the dirty data is off-loaded to one or more regions of non-volatile memory reserved for storing the dirty data or portions thereof.

7. The method of claim 1, further comprising:
   selecting two or more non-volatile devices to receive different portions of the dirty data.

8. The method of claim 1, further comprising:
   powering down at least one of the available non-volatile memory devices responsive to the selection of the subset of non-volatile memory devices; and
   off-loading the dirty data from the volatile cache memory to the selected subset of the non-volatile memory devices.

9. The method of claim 1, wherein selecting the subset of the available non-volatile memory devices further comprises selecting a combination of the available non-volatile memory devices that can receive the different portions of the dirty data while utilizing a least amount of power during the cache offload.

10. A storage device comprising:
    volatile memory storing dirty data; and
    a controller configured to:
       identify a plurality of non-volatile memory devices available to receive different portions of the dirty data during a cache offload performed responsive to detection of a power failure;
       select a subset of the available non-volatile memory devices based on estimated power consumption during the cache offload for different combinations of the available non-volatile memory devices; and
       off-load the dirty data to the selected subset of the available non-volatile memory devices.

11. The storage device of claim 10, wherein the controller is further configured to reconstruct a cache image within the volatile memory responsive to power restoration.

12. The storage device of claim 11, wherein the controller is further configured to flush data of the reconstructed cache image to a corresponding target logical block address in the non-volatile memory responsive to successful reconstruction of the cache image within the volatile memory.

13. The storage device of claim 11, wherein the cache image is flushed to one or more regions of non-volatile memory reserved for storing the cache image or portions thereof.

14. The storage device of claim 11, wherein the controller is further configured to select two or more non-volatile memory devices to receive different portions of the dirty data in the off-load.

15. The storage device of claim 10, wherein the controller is further configured to power down portions of the storage device prior to off-loading the dirty data.

16. The storage device of claim 10, wherein the controller selects the subset of the available non-volatile memory devices that can receive the different portions of the dirty data while utilizing a least amount of power during the cache offload.

17. One or more tangible computer-readable storage media encoding computer-executable instructions for executing on a computer system a computer process, the computer process comprising:
    writing dirty data to a volatile cache memory; and
    responsive to detection of a power failure, identifying a plurality of non-volatile memory devices available to receive different portions of the dirty data during a cache offload;
    selecting a subset of the available non-volatile memory devices based on estimated power consumption during the cache offload for different combinations of the available non-volatile memory devices; and
    off-loading the dirty data to the selected subset of the available non-volatile memory devices.

18. The one or more tangible computer-readable storage media of claim 17, wherein the computer process further comprises:
    off-loading the dirty data from the volatile cache memory to two or more non-volatile memory devices responsive to detection of a power failure, the content and arrangement of the cache data describable by a cache image; and
    reconstructing the cache image of the dirty data and restoring the cache image within the volatile cache memory from the two or more non-volatile memory devices responsive to detection of power restoration following the power failure.

19. The one or more tangible computer-readable storage media of claim 18, wherein the computer process further comprise:
    flushing dirty data of the reconstructed cache image to target non-volatile storage locations.

20. The one or more tangible computer-readable storage media of claim 18, wherein the cache image is off-loaded to one or more regions of non-volatile memory reserved for storing the cache image or portions thereof.

21. The one or more tangible computer-readable storage media of claim 17, wherein selecting the subset of the available non-volatile memory devices further comprises selecting a combination of the available devices that can receive the different portions of the dirty data while utilizing a least amount of power during the cache offload.

* * * * *